United States Patent [19]

Matsubara et al.

[11] Patent Number: 5,699,106
[45] Date of Patent: Dec. 16, 1997

[54] INTERACTIVE PROGRAM SELECTING SYSTEM

[75] Inventors: Yukari Matsubara; Toshiyuki Oda; Hiroaki Takahashi, all of Yokohama; Takashi Takeuchi, Fujisawa, all of Japan

[73] Assignee: Hitachi, Ltd., Tokyo, Japan

[21] Appl. No.: 581,456

[22] Filed: Dec. 29, 1995

[30] Foreign Application Priority Data

Jan. 19, 1995 [JP] Japan ................. 7-006485

[51] Int. Cl.⁶ .......................................... H04N 7/14
[52] U.S. Cl. ................... 348/13; 348/569; 348/7; 348/12
[58] Field of Search .................... 348/7, 6, 12, 13, 348/569, 563, 8, 10; 455/4.1, 4.2

[56] References Cited

U.S. PATENT DOCUMENTS

| | | | |
|---|---|---|---|
| 5,500,794 | 3/1996 | Fujita et al. | 364/188 |
| 5,524,272 | 6/1996 | Podowski et al. | 455/3.2 |
| 5,532,754 | 7/1996 | Young et al. | 348/569 |
| 5,552,551 | 9/1996 | Lett et al. | 348/13 |
| 5,568,180 | 10/1996 | Okamoto | 348/13 |
| 5,596,373 | 1/1997 | White et al. | 348/569 |

FOREIGN PATENT DOCUMENTS

| | | |
|---|---|---|
| 3-165129 | 11/1989 | Japan. |
| 4-44475 | 11/1990 | Japan. |

*Primary Examiner*—Victor R. Kostak
*Attorney, Agent, or Firm*—Fay, Sharpe, Beall, Fagan, Minnich & McKee

[57] ABSTRACT

An interactive program selecting system uses a plurality of channels (broadcasting signals) including a channel dedicated to a menu and has a tuner for receiving a broadcasting signal, a menu screen information extractor for extracting menu screen information, a display data memory for storing display data of menu screen information, a control data memory for storing control data such as a menu screen information number and moving information, a decoder for converting digital data into display data, a display unit, an RC (remote controller) for designating a menu selecting operation by a user, an RC receiver for receiving an RC signal, and a menu selection executing controller responsive to a operation command by the user to control the tuner and the menu screen information extractor.

20 Claims, 10 Drawing Sheets

FIG.4A

Storage table of control data for main menu m1 (401A)

| RC KEY | MOVING DESTINATION ID NUMBER |
|---|---|
| 1 | m2 |
| 2 | m3 |
| 3 | m1 |
| ⋮ 0 | ⋮ |
| NEXT | m2 |
| PREV | m1 |
| RET | m1 |
| OK | m1 |

FIG.4B

Storage table of control data for main menu m2 (401B)

| RC KEY | MOVING DESTINATION ID NUMBER |
|---|---|
| 1 | ch2 |
| 2 | ch5 |
| 3 | |
| ⋮ 0 | ⋮ |
| NEXT | m2 |
| PREV | m1 |
| RET | m1 |
| OK | ch2 |

EXAMPLE OF SCREEN STRUCTURE OF MAIN MENU m1

EXAMPLE OF SCREEN STRUCTURE OF MAIN MENU m2

FIG.11

| RC KEY | CHANNEL NUMBER | MENU SCREEN NUMBER |
|--------|----------------|--------------------|
| 1 | ch2 | m4 |
| 2 | ch2 | m5 |
| 3 | ch3 | m8 |
| ⋮ | | |
| 0 | | |
| NEXT | ch2 | m4 |
| PREV | ch1 | m1 |
| RET | ch1 | m1 |
| OK | ch2 | |

INTERACTIVE PROGRAM SELECTING SYSTEM

BACKGROUND OF THE INVENTION

The present invention relates to an interactive program selecting system suitable for application to an existing broadcasting type CATV (cable television) system and more particularly to an interactive program selecting system which can perform channel selection in a simplified fashion.

Generally, in the conventional broadcasting type CATV, program selection is carried out by direct switching of channel.

When a desired channel is selected from a great number of channels, a technique disclosed in JP-A-4-44475 is available as a method of selecting a channel with ease while decreasing the number of operations and decreasing the number of keys of a remote controller (hereinafter simply referred to as RC). Namely, in the prior art described in this prior art publication, a great number of broadcasting stations are classified into a plurality of categories in accordance with the contents of main broadcasting programs and a channel sorted out in a category is selected at a timing of an RC input.

In a technique disclosed in JP-A-3-165129, a code indicative of the contents of a program is added to a broadcasting signal with the aim of decreasing the time for searching a desired channel and the program sorted out in a category is selected by retrieving the code on the receiving side.

SUMMARY OF THE INVENTION

In the prior arts as above, however, when a program is desired to be selected interactively, two lines of a down-link line for distributing the program and information thereon and an up-link line for transmitting a request by a user to the broadcasting station are needed, giving rise to a problem that the existing equipment of the broadcasting station must be changed to a great extent.

Further, for classification into a plurality of categories on the receiving terminal side, broadcasting signals of individual programs must be altered so as to be added with category data and receiver control data. In addition, the category of a menu cannot be changed at will and in the case where the number of channels is drastically large, the number of control operations for classification and the number of data scanning operations after classification are disadvantageously increased.

The present invention has been made in the light of the above and it is an object of the present invention to permit interactive program selection through only a down-link line in the broadcasting type CATV system and permit changing of broadcasting signal and the number of data scanning operations to be suppressed upon the interactive program selection. Another object of the present invention is to permit, in the broadcasting type CATV, a desired program to be selected interactively from a great number of channels with ease within a short period of time.

To accomplish the above object, an interactive program selecting system according to one aspect of the present invention is made up of an optical cable, for example, using a plurality of channels (broadcasting signals) including a channel dedicated to a menu and transmitting a broadcasting signal, a tuner for receiving the broadcasting signal, a menu screen information extractor for extracting menu screen information, a display data memory for storing display data of the menu screen information, a control data memory for storing control data such as menu screen information numbers and moving information, a decoder for converting digital data into display data, a display unit such as a CRT (cathode ray tube) or a TV display, an RC input unit for designating a menu selecting operation by a user, an RC signal receiver for receiving an RC signal, and a menu selection executing controller responsive to an operation command by the user to control the tuner and the menu screen information extractor.

In addition to the above components, the system may include, as necessary, a storage for temporarily storing a plurality of menu screen information, a graphic drawing function unit added to the display unit or a package medium reproducing unit.

In this interactive program selecting system according to the present invention, a broadcasting station issues to the optical cable a great number of broadcasting signals each containing a broadcasting signal for menu in which data in units of one menu screen are consecutively arranged on the time axis, and the tuner receives a desired channel from broadcasting signals transmitted through the optical cable. The menu screen information extractor extracts menu screen information from the menu broadcasting signal received through the tuner and further extracts and separates the extracted menu screen information to obtain control data and display data. The menu selection executing controller receives an input signal from the RC and controls the tuner and the menu screen information extractor by referencing the extracted control data so as to extract extraction object menu screen information, display display data on the display unit such as a television or a CRT through the decoder, temporarily store display data in the temporary storage, or control the drawing function or an image reproducing unit by referencing the control data.

BRIEF DESCRIPTION OF THE DRAWINGS

FIGS. 4A and 4B are tables showing examples of storage structures of control data in the embodiment of the present invention.

FIG. 11 is a table showing an example of storage structure of control data in the embodiments of FIGS. 8 and 9 of the present invention.

DESCRIPTION OF THE PREFERRED EMBODIMENTS

The present invention will now be described in greater detail by way of example with reference to the accompanying drawings.

Figure 1:
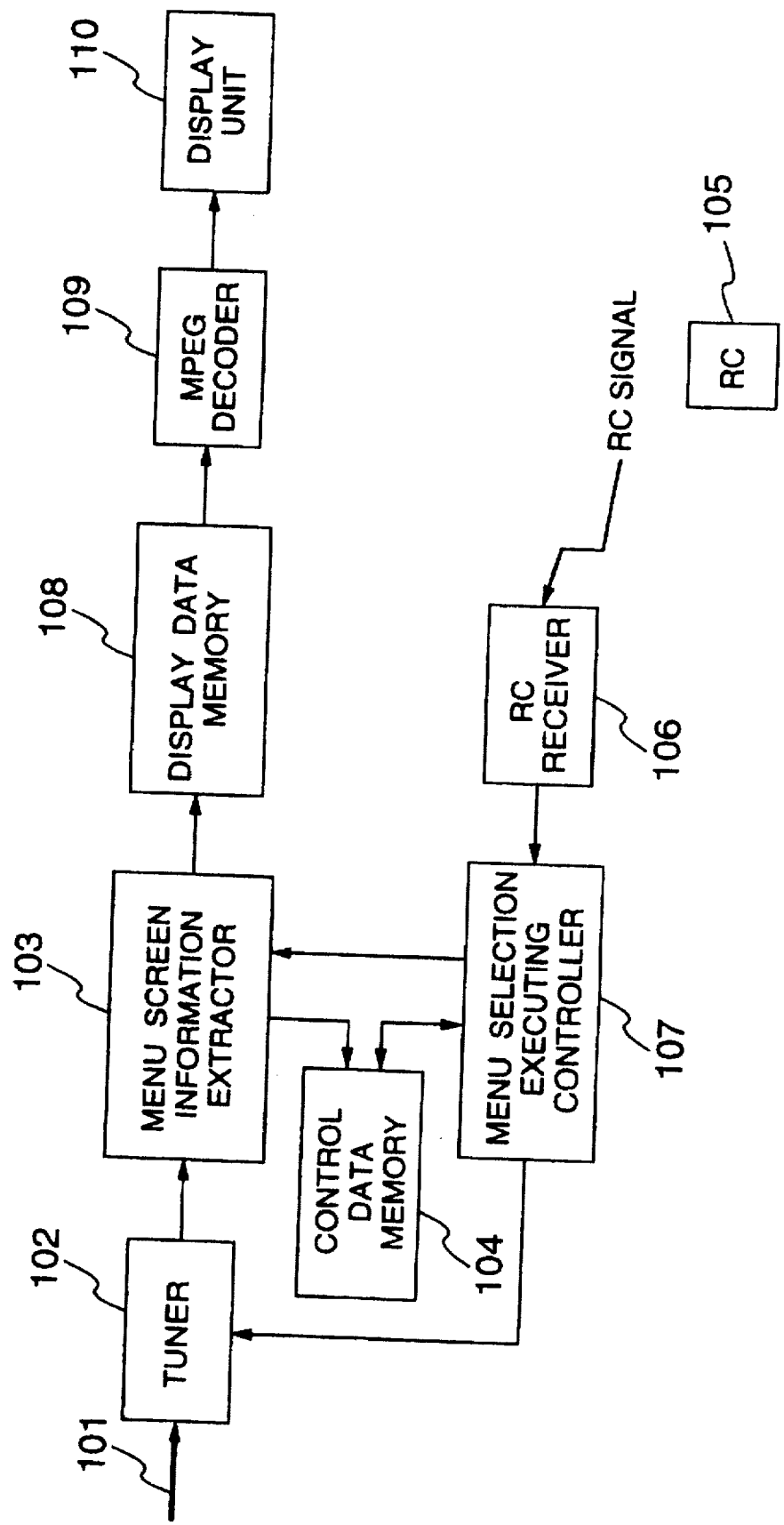
FIG. 1 is a block diagram showing the construction of an interactive program selecting system according to an embodiment of the present invention.

FIG. 1 is a block diagram showing the fundamental construction of an interactive program selecting system according to an embodiment of the present invention.

Figure 5:
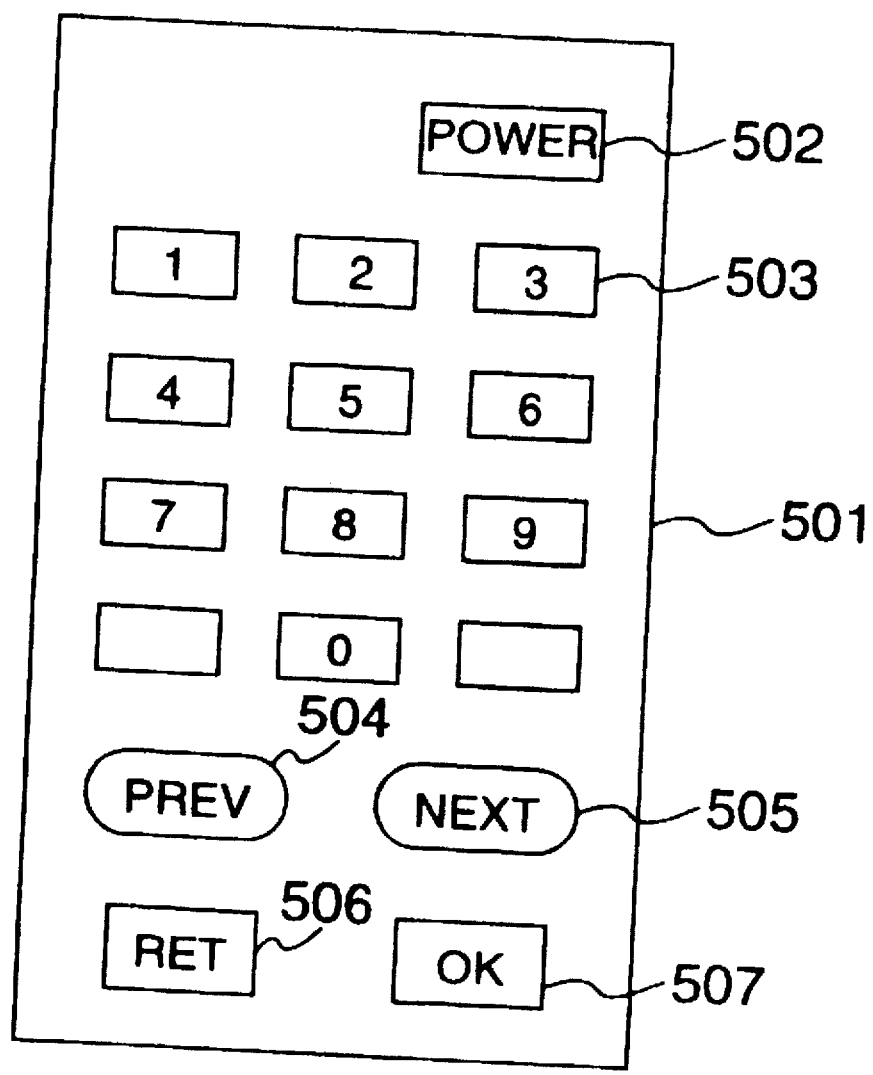
FIG. 5 is a diagram for explaining an example of a key arrangement in the remote controller (RC) in the embodiment of the present invention.

Referring to FIG. 1, an optical cable 101 has a transmission hand of about 600 MHz. A tuner 102 receives a receiving object channel from a broadcasting signal transmitted from the optical cable 101. A menu screen information extractor 103 extracts menu screen information from the broadcasting signal sent from the tuner 102 and then extracts and separates display data and control data from the extracted menu screen information. Details of the display data and control data will be described later. A control data memory 104 stores the control data extracted by the menu Screen information extractor 103. A selective input unit 105 is, for example, a remote controller (RC) which, in the present embodiment, has a key arrangement as shown in FIG. 5. An RC receiver 106 receives a signal from the selective input unit 105. A menu selection executing controller 107 responds to an RC operation by a user which is received through the RC receiver 106 to deliver a channel number to be received or a menu screen number or control information to be extracted to the tuner 102 and to the menu screen information extractor 103 by referencing the control data memory 104. A display data memory 108 such as a DRAM stores the display data extracted by the menu screen information extractor 103. A decoder 109 converts digital data into data for display. Since, in the present embodiment, video data of the MPEG (moving picture experts group) standard is exemplarily used as the digital data, an MPEG decoder meeting the standard is used as the decoder 109. A display unit 110 is formed of, for example, a TV display or a CRT.

In the construction shown in FIG. 1, a multiplexed broadcasting signal of, for example, about 100 channels is transmitted from a broadcasting station to the optical cable 101. In the present embodiment, some channels of this multiplexed broadcasting signal are used for broadcasting signals for menu and the other channels are used for broadcasting signals for programs.

The menu selection executing controller 107 applies a channel number to the tuner 102 to cause it to receive a desired channel, as a receiving object, from the multiplexed broadcasting signal and when receiving a menu broadcasting signal, it applies a menu screen number to the menu screen information extractor 103 to cause it to extract desired menu screen information from the menu broadcasting signal so that a menu may be presented to a user through the display data memory 108, decoder 109 and display unit 110. Further, the menu selection executing controller 107 refers to the control data memory 104 on the basis of a signal obtained through the RC operation by the user to extract the next menu information or select a desired program.

Figure 2:
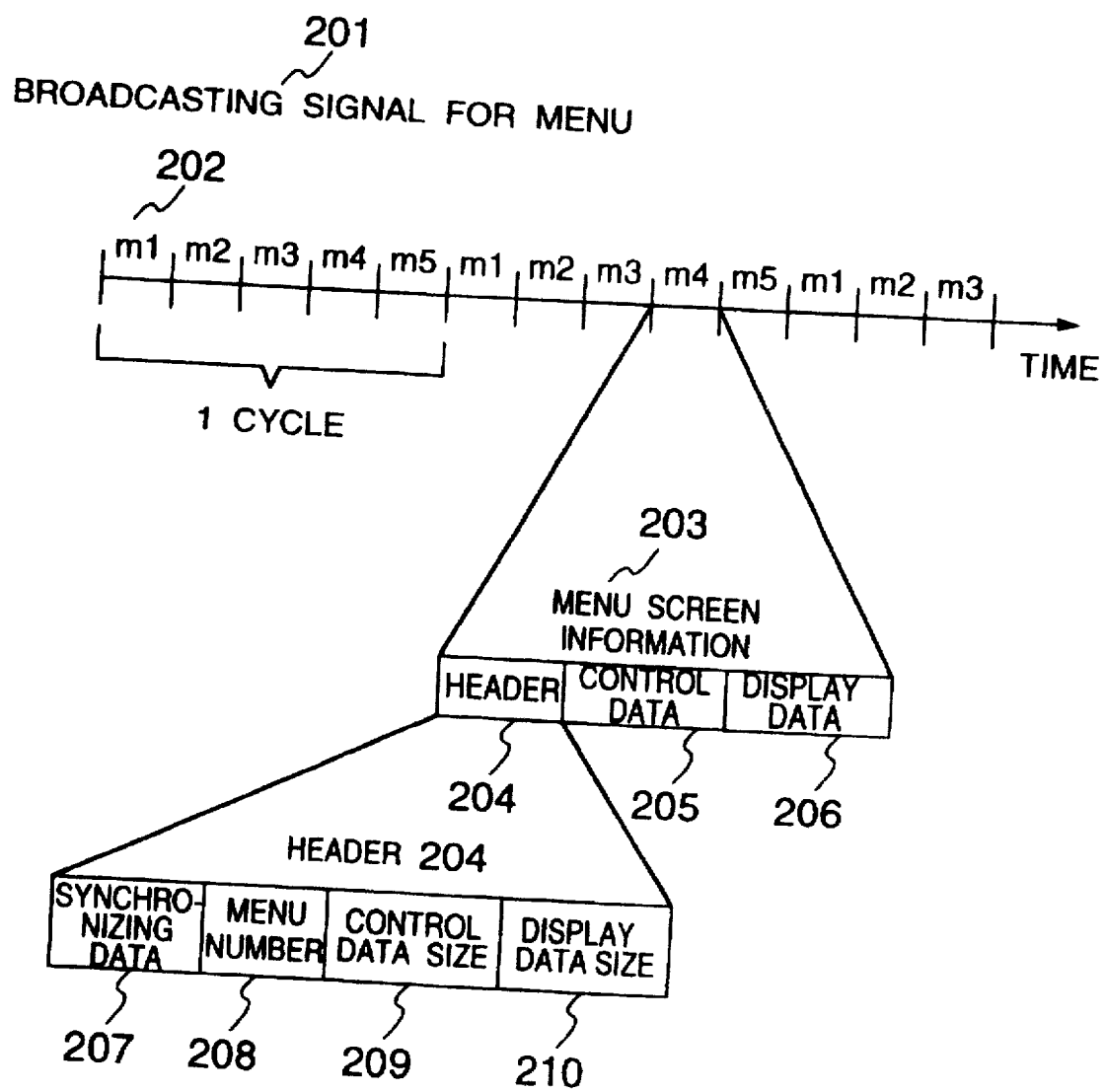
FIG. 2 is a diagram for explaining the concept of transmission of menu screen information and a structure of a signal indicative of the menu screen information in the embodiment of the present invention.

FIG. 2 is a diagram showing an example of a signal format when a broadcasting signal is used as a menu. As shown in the figure, a broadcasting signal for menu 201 consists of a plurality of menu screen information 203. A menu screen number 202 is assigned to each menu screen information 203 and menu screen numbers (here, m1, m2, . . .) are consecutively arranged on the time axis of the broadcasting signal. A consecutive arrangement of all menu screen information 203 (m1–m5 in the example shown in FIG. 2) is defined as one cycle and this cycle is repetitively arranged. The menu screen information 203 is a still picture frame which contains digital data of about 50 KB compressed pursuant to the MPEG1 standard, wherein the digital data consists of a header 204, control data 205 and display data 206.

The header 204 is information of a fixed size disposed at the head of the menu screen information 203 and is used in the menu screen information extractor 103 to identify the menu screen number and the data size. The header 204 consists of synchronizing data 207 for indicating a position at which extraction of menu screen information from a menu broadcasting signal starts, a menu screen number 208, a control data size 209 indicative of a size of the control data 205, and a display data size 210 indicative of a size of the display data 206.

The control data 205 is information for associating a menu item displayed as a menu with a corresponding program selecting method. Details of the control data will be described in connection with FIG. 4 to be described later.

The display data 206 is digital data of, for example, about 50 KB of the still picture frame and after being stored in the display data memory 108, it is decoded by means of the MPEG decoder 109 and then displayed on the display unit 110. The display data 206 is compressed in accordance with a picture pattern of a menu screen and therefore its size differs correspondingly. Obviously, the size of data in the still picture frame is in no way limited to 50 KB.

Figure 3:
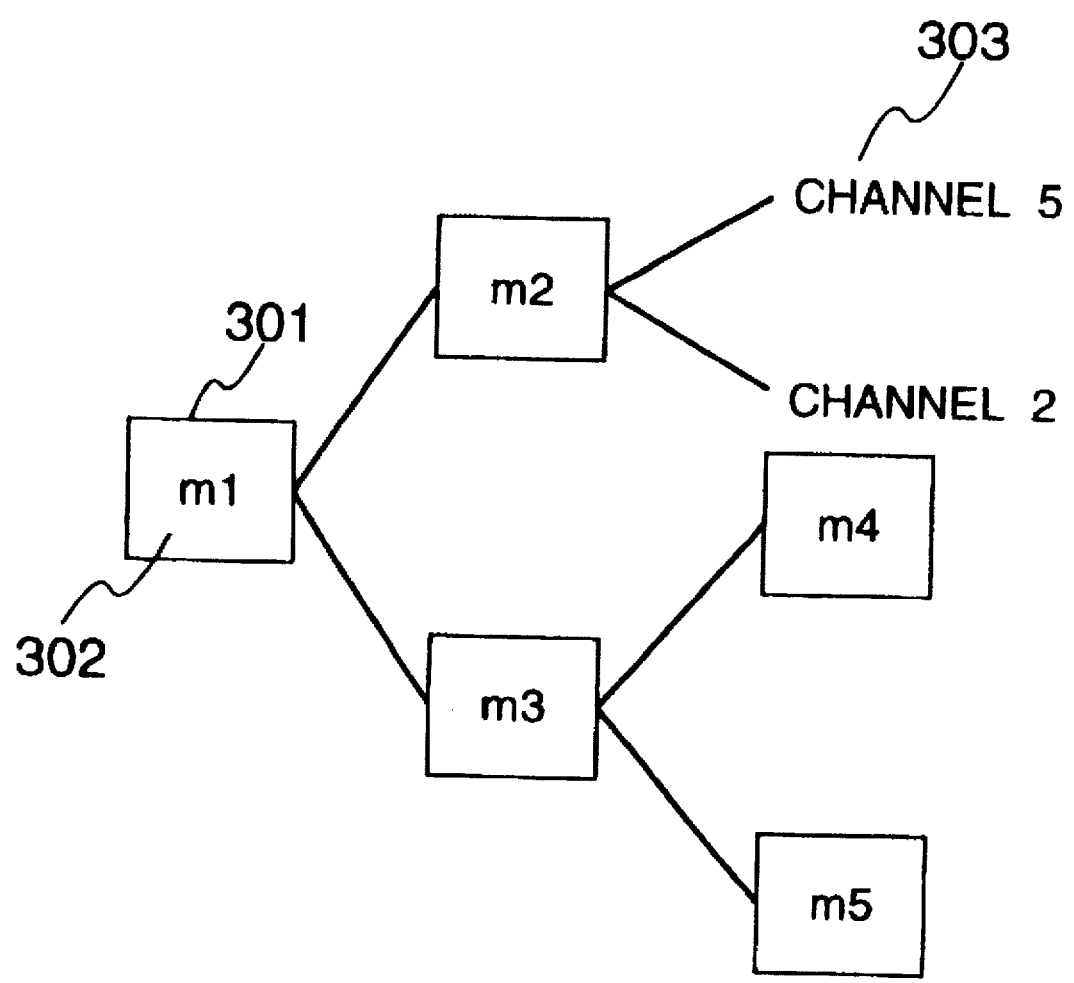
FIG. 3 is a diagram for explaining a hierarchical structure of the menu screen information in the embodiment of the present invention.

FIG. 3 shows transitions of menu screen presented to a user. Referring to FIG. 3, how an operation by a user causes a transition of menu screen and a method for program selection will be described. Making reference also to FIGS. 4A and 4B, details of the control data 205 will be described.

In FIG. 3, transitions of menu screen are illustrated by nodes and link lines. Each node 301 has information corresponding to one menu screen information 203 and in the figure, reference numeral 302 designates a menu screen number and a channel number 303 indicates a program channel to be connected. An example shown in FIG. 3 consists of five nodes m1 to m5, wherein link lines interconnecting respective nodes are representative of possible direct transitions available by user's operation, the link lines being defined by control data 205 of menu screen information 203. The menu screen information extractor 103 analyzes a header 204 of transmitted menu screen information 203, extracts control data 205 of a size indicated by a control data size 209 from the menu screen information 203, and stores extracted control data 205 in the control data memory 104 in the form of a table as shown in FIG. 4A or 4B.

FIG. 5 is a diagram showing an example of a key arrangement of the RC unit used as the selective input unit 105. In the RC unit 501 of FIG. 5, reference numeral 502 designates a switch key for a power supply of a receiving terminal, 503 numerical keys, 504 a PREV (previous) key used by a user who carries out a returning operation to the previous menu, 505 a NEXT key used by a user who carries out an advance operation to the next menu, 506 a RET (return) key used by a user who carries out a returning operation to a one or more preceding menu, and 507 an OK key used by a user who carries out an operation of acknowledging a menu item which is presented as being selected.

FIGS. 4A and 4B are examples of tables used in order for the menu screen information extractor 103 to store extracted control data 205, with FIG. 4A being a storage table of control data for a main menu m1 (menu screen information 203 at m1 in FIG. 2) and FIG. 4B being a storage table of control data for a menu m2 (menu screen information 203 at m2 in FIG. 2). In tables 401A and 401B for individual menus of the control data memory 104, parameters such as RC keies 402 and corresponding moving destination ID number 403 are stored in association each other. The RC keies 402 indicate operation keys of the RC unit 501 and the moving destination ID numbers 403 signify menu screen numbers or channel numbers of transition destinations corresponding to respective operation keys of the RC unit 501. The moving destination ID numbers 403 are set in advance by the broadcasting station in order that a menu screen information hierarchical structure as shown in FIG. 3 is constructed.

Figure 7:
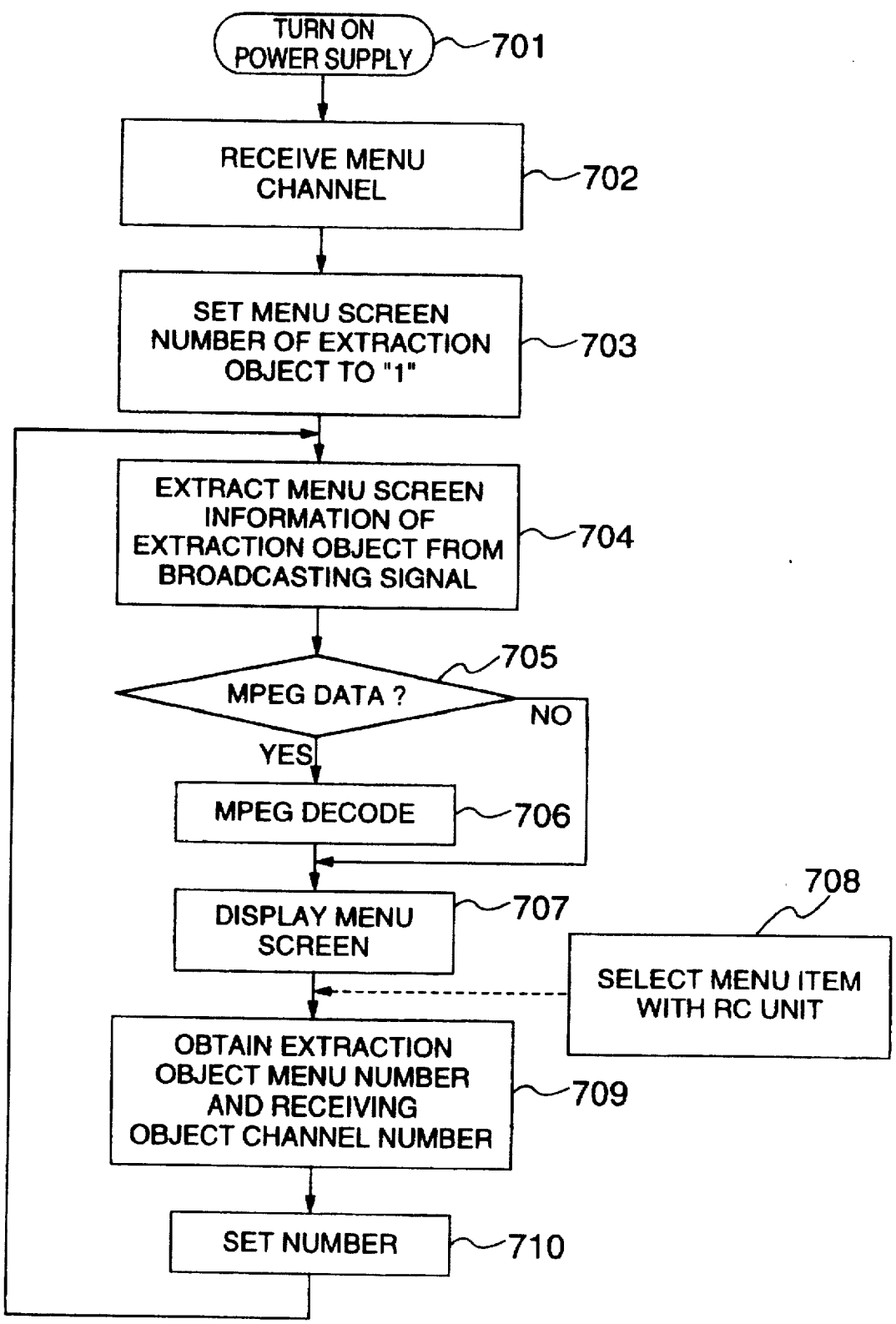
FIG. 7 is a flow chart showing the operational flow of the menu selection executing controller in the embodiment of the present invention.

The program selecting operational procedure according to the present embodiment will now be described with reference to an operational flow chart of menu selection executing controller 107 shown in FIG. 7.

Menu screen information 203 is broadcast from the broadcasting station to a channel for menu through the optical cable 101 having a transmission band of about 600 MHz. The menu screen information 203 has the aforementioned hierarchial structure shown in FIG. 3. When the power supply of the receiving terminal is turned on (step 701), the menu selection executing controller 107 sets "1" which is the broadcasting signal number for menu to the receiving object broadcasting signal number of the tuner 102 to cause the tuner to receive a menu channel (step 702).

Thus, the tuner 102 receives the menu channel and sends the menu screen information 203 to the menu screen information extractor 103. At the same time, the menu selection executing controller 107 sets the main menu screen number "1" to the menu screen information extractor 103 to cause it to extract main menu screen information (menu screen information at m1 in FIG. 2) from the menu screen information 203 (step 703).

The menu screen information extractor 103 analyzes a header 204 of the sent menu screen information 203 and extracts main menu screen information having the menu number 208 being "1". Then, the menu screen information extractor 103 picks up, as control data 205, data corresponding to the size of the control data from the extracted main menu screen information by referencing the header information and stores the thus separated and extracted control data 205 in the control data memory 104 in a format as shown in the aforementioned table 401A; and similarly, the menu screen information extractor 103 picks up, as display data 206, data corresponding to the size of the display data from the extracted main menu screen information by referencing the header information and stores the thus separated and extracted display data 206 in the display data memory 108 (step 704).

The display data memory 108 (or a system controller not shown) decides whether the stored display data 206 is MPEG data (step 705). If MPEG data, this data is decoded into display data through the MPEG decoder 109 (step 706) and a menu screen is then displayed on the display unit 110 (step 707) but if not MPEG data, this data is displayed directly as a menu screen on the display unit 110 (step 707).

Figure 6A:
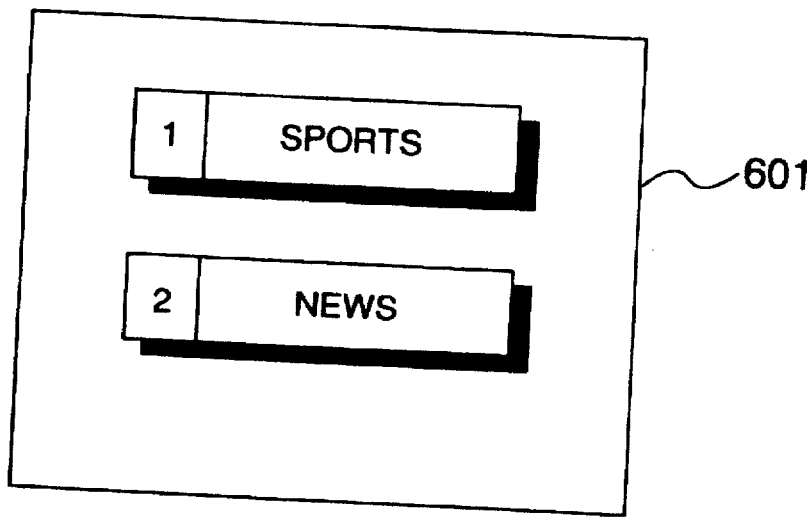
FIGS. 6A and 6B are diagrams respectively showing examples of screen structures of a main menu m1 and a menu m2 in the embodiment of the present invention.

Here, a menu screen (screen of main menu m1) 601 is first presented which has a channel number "1" and menu screen number "1" and which has a screen structure as shown in FIG. 6A. The menu screen 601 is the main menu screen corresponding to the node 301 at m1 in FIG. 3 and it contains selection items of, for example, "1; sports" and "2; news".

For example, when a user depresses a numerical key 503 corresponding to "1" of the RC unit 501 to select "1; sports" while the menu screen 601 being displayed (step 708), the RC receiver 106 receives an RC signal and sends it to the menu selection executing controller 107. The menu selection executing controller 107 references a parameter which corresponds to a signal generated by RC operation of depressing the numerical key "1" in the control data storage table 401A shown in FIG. 4A to obtain an extraction object menu screen number m2 as a moving destination ID number (step 709) and uses this moving destination ID number to control the menu screen information extractor 103 so as to cause it to extract the menu screen information m2 (step 710).

Figure 6B:
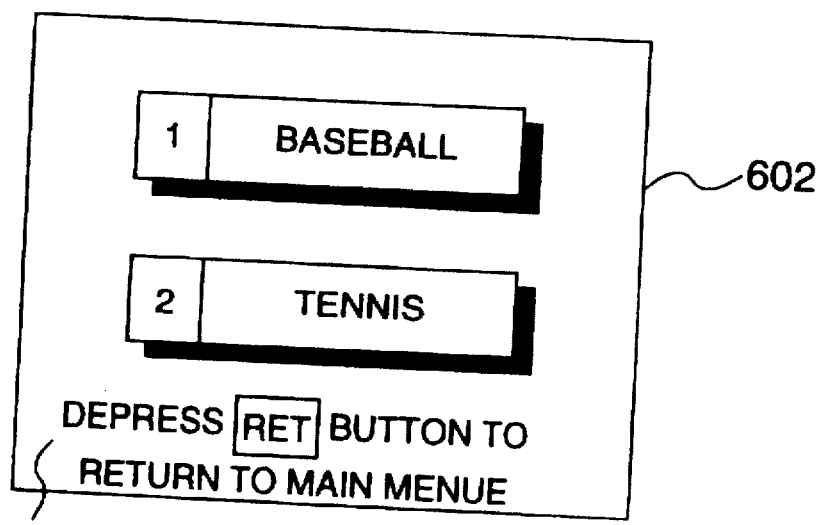

FIG. 6B shows an example of a menu screen structure of the menu m2 presented on the display unit 110. A menu screen 602 of the menu m2 contains selection items of, for example, "1; baseball" and "2; tennis". If a user selects "1", for example, the menu execution selecting controller 107 references a parameter which corresponds to RC operation of depressing numerical key "1" in the control data storage table 401B as shown in FIG. 4B to obtain a channel 2 representative of the receiving object channel number as a moving destination ID number and controls the tuner 102 to cause it to receive that channel.

As described above, in the existing broadcasting type CATV system using only a down-link line from the broadcasting station, a program can be selected interactively and a desired channel can be selected from a great number of channels easily, steadily and rapidly through the above-described operation. Further, by rewriting control data for menu screen information in compliance with the time for broadcasting a program broadcasting, the program can be selected and watched or listened in good time.

A second embodiment of the present invention will be described with reference to FIGS. 8 and 11.

Figure 8:
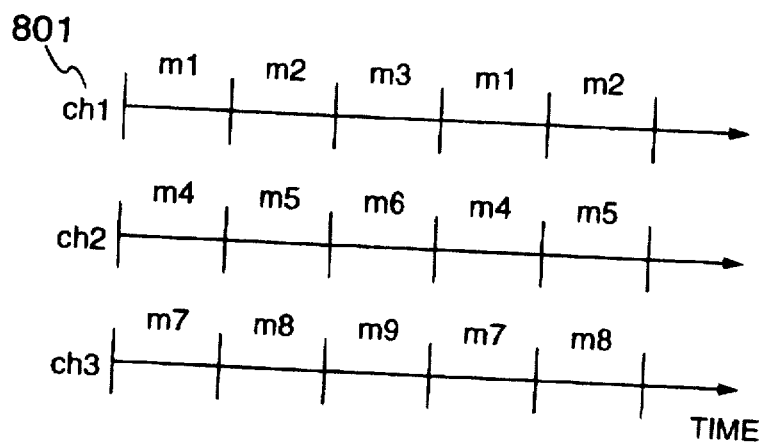
FIG. 8 is a diagram for explaining the concept of transmission of menu screen information in another embodiment of the present invention.

FIG. 8 is a diagram showing the concept of transmission of menu screen information in an interactive program selecting system according to another embodiment of the present invention. The fundamental construction of the system of the present embodiment is similar to that of the embodiment first described with reference to FIG. 1 but differs in that a plurality of channels are used for broadcasting signals for menu. With reference to FIG. 8, a method which uses a plurality of menu broadcasting signals to switch the menu screen rapidly without imposing a waiting time on a user will now be explained.

In the example shown in FIG. 8, as menu screen information, there are menu numbers m1 to m9 in total, a part of menu screen information 203 (here, m1 to m3) are consecutively arranged in a channel 1 and defined as one cycle. This cycle is arranged repetitively. In the figure, reference numeral 801 designates a channel number. Thus, menu screen information 203 of m4 to m6 are similarly arranged in a channel 2 and menu screen information 203 of m7 to m9 are similarly arranged in a channel 3. This ensures that a period of time corresponding to one cycle can be shorter in this example than in the aforementioned example of FIG. 2, thereby enabling the menu selection executing controller 107 to easily synchronize with the extracted object menu screen information.

Further, according to a method for distribution of menu screen information in which, for example, the number of menu information per channel is changed in accordance with the frequency of use by, for example, decreasing the period of one cycle of menu screen information which is used frequently and increasing the period of one cycle of menu screen information which is used less frequently so that the menu information having different cycles are distributed to respective menu broadcasting signals, the synchronizing data can be detected rapidly for extraction of the menu screen information and in addition, the response of display of menu screen of highly frequent use can be improved.

In this case, as shown in a control data storage table of FIG. 11, parameters of extraction object in control data are provided including the RC key 402 and moving destination ID number 403 which are described in connection with FIGS. 4A and 4B, the moving destination ID number 403 herein consisting of a channel number 1101 on which menu screen information is transmitted and a menu screen number 1102. Control data can be referenced in a manner similar to that described in connection with FIG. 1 but particularly, in the present embodiment, when the menu selection executing controller 107 executes menu transition, it sends an extraction object menu screen number to the menu screen information extractor 103 and concurrently therewith, sends a receiving object broadcasting signal number to the tuner 102 to perform interactive program selection using a plurality of menu broadcasting signals.

Still another embodiment of the present invention will be described with reference to FIGS. 9 to 11.

Figure 9:
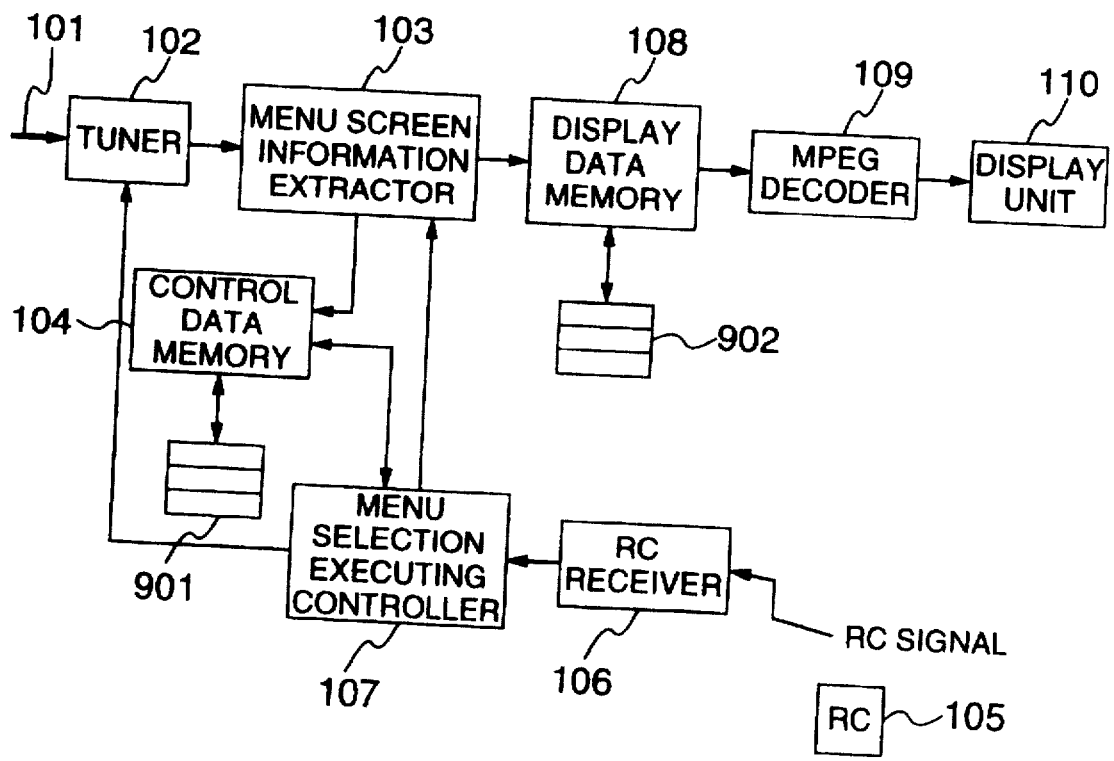
FIG. 9 is a block diagram showing the construction of an interactive program selecting system according to still another embodiment of the present invention.

FIG. 9 is a block diagram showing the construction of an interactive program selecting system according to the present embodiment and, in the figure, constituents corresponding to those in FIG. 1 are designated by like reference numerals and their description will be omitted for avoidance of prolixity. The present embodiment differs from the embodiment of FIG. 1 in that the control data memory 104 is added with a control data temporary storage 901 and the display data memory 108 is added with a display data temporary storage 902, and with the construction as above, aims at performing rapid display of menu screen information which otherwise will possibly make a transition. The storage structure of control data in the present embodiment is quite the same as that of FIG. 11.

Figure 10:
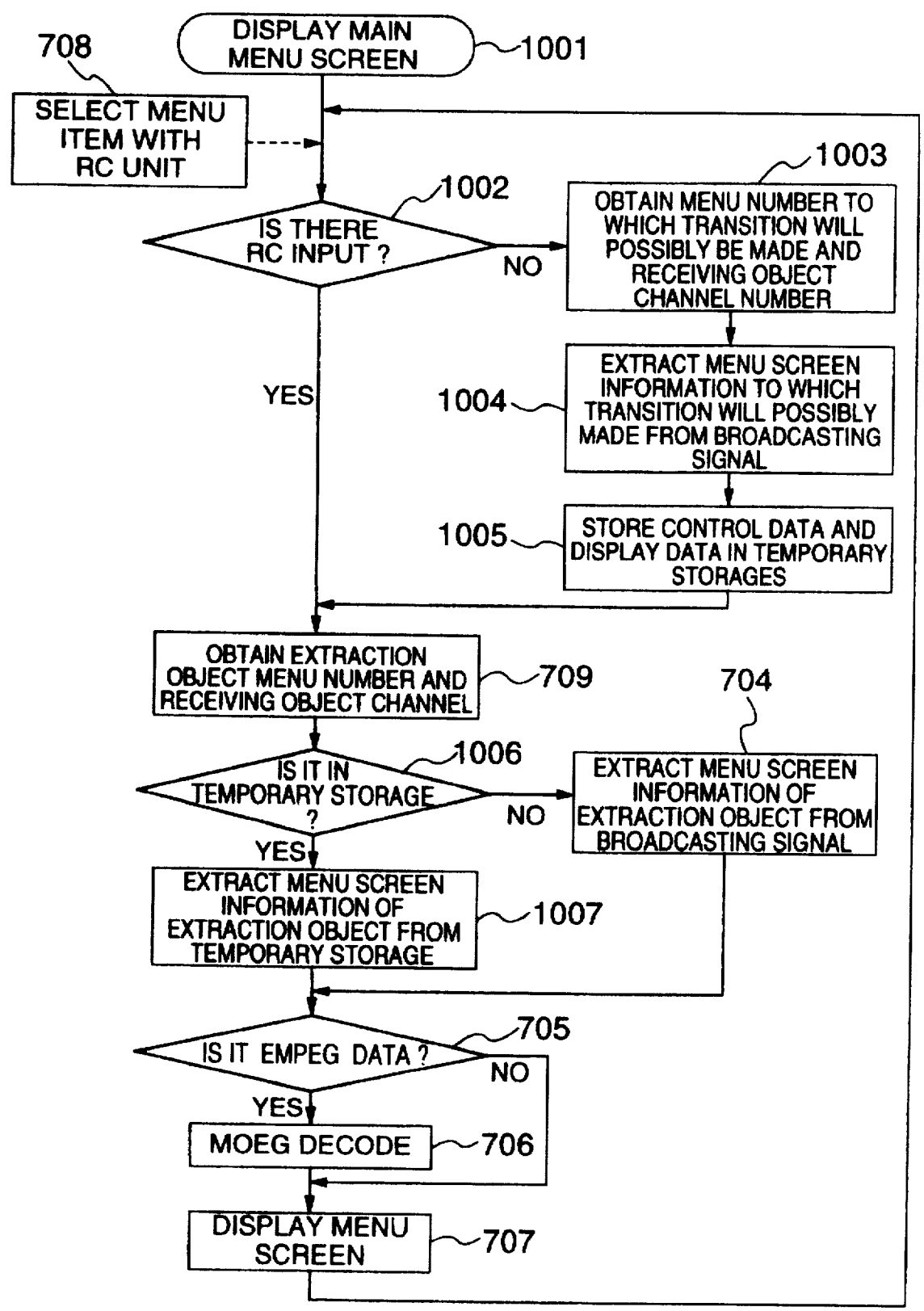
FIG. 10 is a flow chart showing the operational flow of the menu selection executing controller in the FIG. 9 embodiment of the present invention.

FIG. 10 shows an Operational flow chart of the menu selection executing controller 107 in the present embodiment. With reference to FIG. 10, a program selecting operation in the present embodiment will now be explained. In FIG. 10, steps corresponding to those in FIG. 7 described previously are designated by like reference numerals.

After the menu selection executing controller 107 presents a main menu screen to a user as in the case of the first mentioned embodiment (step 1001), it waits for a selection input from the user (step 708) and then decides whether there is a menu selection input from the user (step 1002). In the absence of any selection input from the user, the menu selection executing controller 107 references a main menu of the control data memory to obtain a menu screen number to which a transition will possibly be made, that is, a menu screen number indicated by a parameter 1102 in the control data storage table of FIG. 11 (step 1003) and extracts menu screen information 203 of an extraction object from a broadcasting signal (step 1004), whereby control data 205 extracted and separated from the extracted menu screen information 203 is stored in the control data temporary storage 901 and display data 206 extracted and separated from the extracted menu screen information 203 is stored in the display data temporary storage 902 (step 1005).

On the other hand, after the main menu screen is presented (step 1001), if a selection input from the user exists (namely, if "Yes" results in step 1002), the menu selection executing controller 107 checks whether menu screen information corresponding to the RC operation exists in the display data temporary storage 902 (step 1006). In the absence of any extraction object menu screen in the display data temporary storage 902, the menu selection executing controller 107 extracts menu screen information of an extraction object from a menu broadcasting signal received by the tuner 102 (step 704). In the presence of extraction object menu screen information in the display data temporary storage 902, the menu selection executing controller 107 extracts the menu screen information of the extraction object from the display data temporary storage 902 (step 1007) and sends the extracted information to the MPEG decoder 109. Thereafter, the program proceeds to steps 705, 706 and 707 corresponding to those in FIG. 7.

Further, when a package medium (image reproducing unit) such as a CD-ROM is connected to the receiving terminal or built therein in each embodiment of the present invention, a variety of types of menu screen display and programs which include image information recorded in the package medium can be presented by adding an ID number to the package medium and adding the package medium ID number and apparatus control information to the header of the menu screen information.

Also, for example, when the display unit 110 has an on-screen display (OSD) function in each embodiment of the present invention, a character pattern, for example, generated in the receiving terminal can be added by adding a code to control data in the menu screen information and using the OSD function so that the character pattern may be displayed on the menu screen in superimposed fashion. In the example of the screen structure of menu m2 in FIG. 6B, reference numeral 603 designates an image obtained when such an on-screen display is actually used. Further, when a graphic drawing function is added to the receiving terminal, a program from the broadcasting station can be combined with an image in the receiving terminal by adding data for control of the graphic drawing function to the control data, thereby ensuring that a more complicated screen can be produced.

In each embodiment set forth so far, the optical cable 101 having a transmission band of 600 MHz is used but a transmission medium having another frequency band may be used. For example, a transmission medium based on a broadcasting satellite may be employed. The digital data serving as the menu screen information, for example, the digital data of the MPEG format may be digital data which is compressed through a different method.

As described above, in the interactive program selecting system according to the present invention, by providing a channel dedicated to a menu, consecutively broadcasting menu screen information on the channel and displaying a menu screen in accordance with control data in synchronism therewith in the receiving terminal, interactive program selection can be effected without using any up-link line even in the broadcasting type CATV system. Accordingly, a desired program can be selected interactively, rapidly and easily, from a great number of channels on the receiving side without changing the equipment on the broadcasting station side in the existing CATV system, thus promoting convenience to the user.

Further, by providing a plurality of menu channels, distributing broadcasting signals in compliance with the frequency of use or storing menu screen information which will possibly make a transition in the display data temporary storage in the receiving terminal before display is performed, switching of the menu screen can be effected rapidly. Furthermore, by connecting a package medium to the receiving terminal and adding apparatus control information to control data, various types of menu display and programs can be presented.

What is claimed is:

1. An interactive program selecting system comprising:

a tuner for receiving a desired broadcasting signal from a multiplexed broadcasting signal composed of a plurality of multiplexed broadcasting signals, each of said plurality of broadcasting signals having at least one channel of a broadcasting signal for menu containing a plurality of menu screen information, said plurality of menu screen information being precedently linked to each other in the form of a hierarchical structure;

display data memory means for storing display data contained in the broadcasting signal received by said tuner;

display means for displaying the display data stored in said display data memory means;

selective input means for permitting, when a menu screen is being displayed, a user to select a desired one of menu items indicated in the displayed menu screen and delivering a corresponding operation command;

menu screen information extracting means connected to said tuner for extracting a specified menu screen information from said menu broadcasting signal and storing display data contained in the specified menu screen information in said display data memory means; and menu selection executing control means responsive to said operation command for controlling said menu screen information extracting means to cause it to display the display data in the menu item selected by the user on said display means.

2. An interactive program selecting system according to claim 1, wherein said menu selection executing control means responds to said operation command to designate a broadcasting signal to be received to said tuner.

3. An interactive program selecting system according to claim 1, wherein each of said menu screen information contains control data indicating a menu display control procedure corresponding to said operation command, and said menu selection executing control means responds to the operation command to reference the control data and extracts extraction object menu screen information in accordance with the corresponding procedure.

4. An interactive program selecting system according to claim 3, wherein said control data contains receiving object broadcasting signal numbers and extraction object menu screen numbers, said tuner obtains a receiving object broadcasting signal number from said menu selection executing control means to receive said receiving object broadcasting signal from said plurality of broadcasting signals, and said menu screen information extracting means obtains an extraction object menu screen number from said menu selection executing control means to extract extraction object menu screen information.

5. An interactive program selecting system according to claim 3 further comprising control data memory means, wherein each of said menu screen information has a header for specifying each menu screen information, and said menu screen information extracting means separates the control data and the display data on the basis of information of the header to store said control data in said control data memory means and said display data in said display data memory means.

6. An interactive program selecting system according to claim 3 further comprising image reproducing means, wherein said control data contains data for controlling said image reproducing means, and said menu selection executing control means controls said image reproducing means by referencing said control data.

7. An interactive program selecting system according to claim 1, wherein said menu broadcasting signal is constructed by arranging a finite number of menu screen information repetitively in specified order on the time axis.

8. An interactive program selecting system according to claim 1 further comprising menu screen information temporary storage means, wherein said menu selection executing control means is responsive to said operation command to reference menu screen information of a menu screen being displayed and to store menu screen information which possibly occurs next in said menu screen information temporary storage means.

9. An interactive program selecting system according to claim 8, wherein said menu selection executing control means responds to said operation command to reference said menu screen information temporary storage means so as to read menu screen information corresponding to said operation command from said display data memory means and display the menu screen information read.

10. An interactive program selecting system according to claim 1, wherein a plurality of said menu broadcasting signals are used, and individual broadcasting signals have a different number of menu screen information in accordance with a presupposed frequency of menu screen reproduction.

11. An interactive program selecting system comprising:

a tuner receiving a desired broadcasting signal from a multiplexed broadcasting signal composed of a plurality of multiplexed broadcasting signals, each of said plurality of broadcasting signals having at least one channel of a broadcasting signal for menu containing a plurality of menu screen information, said plurality of menu screen information being precedently linked to each other in the form of a hierarchical structure;

a display data memory storing display data contained in the broadcasting signal received by said tuner;

a display unit displaying the display data stored in said display data memory;

a menu item selecting unit permitting, when a menu screen is displayed, a user to select a desired one of menu items indicated in the displayed menu screen and delivering an operation command corresponding to that selection;

a menu screen information extractor extracting specified menu screen information from said menu broadcasting signal and storing display data contained in the specified menu screen information; and a menu selection executing controller responsive to said operation command of said menu item selecting unit to control said menu screen information extractor to cause it to display the display data in the menu item selected by said user on said display unit.

12. An interactive program selecting system according to claim 11, wherein said menu selection executing controller responds to said operation command to designate a broadcasting signal to be received to said tuner.

13. An interactive program selecting system according to claim 11, wherein each of said menu screen information contains control data indicating a menu display control procedure corresponding to said operation command, and said menu selection executing controller responds to the operation command to reference the control data and extracts extraction object menu screen information in accordance with the corresponding procedure.

14. An interactive program selecting system according to claim 13, wherein said control data contains receiving object broadcasting signal numbers and extraction object menu screen numbers, said tuner obtains a receiving object broadcasting signal number from said menu selection executing controller to receive said receiving object broadcasting signal from said plurality of broadcasting signals, and said menu screen information extractor obtains an extraction object menu screen number from said menu selection executing controller to extract extraction object menu screen information.

15. An interactive program selecting system according to claim 13 further comprising a control data memory, wherein each of said menu screen information has a header for specifying each menu screen information, and said menu screen information extractor separates the control data and the display data on the basis of information of the header to store said control data in said control data memory and said display data in said display data memory.

16. An interactive program selecting system according to claim 13 further comprising an image reproducing unit, wherein said control data contains data for controlling said image reproducing unit, and said menu selection executing controller controls said image reproducing unit by referencing said control data.

17. An interactive program selecting system according to claim 11, wherein said menu broadcasting signal is constructed by arranging a finite number of menu screen information repetitively in specified order on the time axis.

18. An interactive program selecting system according to claim 11 further comprising a menu screen information temporary storage, wherein said menu selection executing controller responds to said operation command to reference menu screen information of a menu screen being displayed and to store menu screen information which possibly occurs next in said menu screen information temporary storage in accordance with said operation command.

19. An interactive program selecting system according to claim 18, wherein said menu selection executing controller responds to said operation commands to reference said menu screen information temporary storage so as to read menu screen information corresponding to said operation command from said display data memory and display the menu screen information read.

20. An interactive program selecting system according to claim 11, wherein a plurality of said menu broadcasting signals are used, and individual broadcasting signals have a different number of menu screen information in accordance with a presupposed frequency of menu screen reproduction.

* * * * *